(12) United States Patent
Matsui et al.

(10) Patent No.: US 12,498,506 B2
(45) Date of Patent: Dec. 16, 2025

(54) WINDOW MATERIAL FOR OPTICAL ELEMENT, LID FOR OPTICAL ELEMENT PACKAGE, OPTICAL ELEMENT PACKAGE, AND OPTICAL DEVICE

(71) Applicant: Shin-Etsu Chemical Co., Ltd., Tokyo (JP)

(72) Inventors: Harunobu Matsui, Joetsu (JP); Daijitsu Harada, Joetsu (JP); Masao Ando, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 396 days.

(21) Appl. No.: 17/969,298

(22) Filed: Oct. 19, 2022

(65) Prior Publication Data

US 2023/0148016 A1      May 11, 2023

(30) Foreign Application Priority Data

Nov. 10, 2021   (JP) .................................. 2021-183316

(51) Int. Cl.
*G02B 1/02*      (2006.01)
*H10H 20/85*    (2025.01)

(52) U.S. Cl.
CPC ............ *G02B 1/02* (2013.01); *H10H 20/8506* (2025.01)

(58) Field of Classification Search
CPC ....... C03C 15/00; C03C 2204/08; G02B 1/02; G02B 19/0047; G02B 19/0076;
(Continued)

(56) References Cited

U.S. PATENT DOCUMENTS

| 2018/0040777 A1* | 2/2018 | Matsui | ................... C03C 27/00 |
| 2018/0040778 A1* | 2/2018 | Ueda | .................. H10H 20/8506 |
| 2022/0315482 A1* | 10/2022 | Tanibe | .................... C03C 15/00 |

FOREIGN PATENT DOCUMENTS

| EP | 3 279 953 A1 | 2/2018 |
| EP | 3 882 672 A1 | 9/2021 |

(Continued)

OTHER PUBLICATIONS

Extended European Search Report for European Application No. 22202375.6, dated Mar. 20, 2023.

*Primary Examiner* — Mark W Tornow
*Assistant Examiner* — Priya M Rampersaud
(74) *Attorney, Agent, or Firm* — Birch, Stewart, Kolasch & Birch, LLP (57) ABSTRACT

The window material for an optical element of the present invention is formed of synthetic quartz glass that is likely to be subjected to shape processing, can be manufactured at low cost, and has a flat plate shape. Even if the window material for an optical element has a flat plate shape, for example, in a window material of a UV-LED such as a UVC-LED sealed with a surface mount package (SMD PKG), light emitted from the optical element, in particular, light having a light distribution angle can be efficiently collected when passing through the window material, and light collection equal to that of a window material having a lens shape such as a conventional convex shape can be achieved. Furthermore, light distribution without irradiation unevenness such as Lambertian reflection can also be achieved.

16 Claims, 5 Drawing Sheets

(58) Field of Classification Search
CPC ... C03B 19/066; C03B 20/00; B23K 2103/54; F21V 3/061; H01L 33/483; H10H 20/855; H10H 20/8506; B32B 2307/538; H10F 77/40

See application file for complete search history.

(56) References Cited

FOREIGN PATENT DOCUMENTS

| | | |
|---|---|---|
| JP | 2019-220507 A | 12/2019 |
| JP | 2020-25089 A | 2/2020 |

* cited by examiner

WINDOW MATERIAL FOR OPTICAL ELEMENT, LID FOR OPTICAL ELEMENT PACKAGE, OPTICAL ELEMENT PACKAGE, AND OPTICAL DEVICE

CROSS-REFERENCE TO RELATED APPLICATION

This non-provisional application claims priority under 35 U.S.C. § 119(a) on Patent Application No. 2021-183316 filed in Japan on Nov. 10, 2021, the entire contents of which are hereby incorporated by reference.

TECHNICAL FIELD

The present invention relates to a window material for an optical element and a lid for an optical element package suitable for an optical element package and an optical device which are required to control light distribution properties. The present invention also relates to an optical element package in which an optical element such as an ultraviolet ray emitting diode is sealed, and an optical device.

BACKGROUND ART

In recent years, in applications of inactivation of viruses such as coronaviruses and sterilization of water, an element capable of emitting light having an ultraviolet region, that is, an ultra violet-light emitting diode (UV-LED) has been studied as an alternative to an element subjected to environmental regulations such as a mercury lamp. Among them, an element capable of emitting light in a deep ultraviolet (UV-C) region, that is, a deep ultraviolet light emitting diode (UVC-LED) has attracted attention. For example, the UV-LED is mounted by a flip chip method because light cannot be transmitted from a sapphire substrate or the like as a substrate when a layer forming an element is stacked, and taken out. Therefore, the element is an element that emits light having a light distribution angle and does not often emit light having high directivity such as laser beam. A method capable of controlling light distribution properties is required from the viewpoint of improving light extraction efficiency and eliminating the illuminance unevenness of light.

At present, if a resin which is generally used in a white LED or the like is molded and sealed in a lens shape, a UV-LED having high output causes a problem that the resin is deteriorated by short-wavelength light emitted by an element. Therefore, it is considered that a surface mount type package (SMD PKG) sealed with synthetic quartz having good transmittance of short-wavelength light as a window material is most preferably selected as a UV-LED package, and light distribution properties are controlled based on the SMD PKG.

For example, JP-A 2019-220507 (Patent Document 1) discloses a light emitting device. The light emitting device includes a plurality of cylindrical lenses in order to obtain the uniformity of light emitted from a light emitting diode having an ultraviolet region with respect to an illuminance surface. JP-A 2020-025089 (Patent Document 2) discloses an LED device including a deep ultraviolet LED element. In the LED device, an optical member (lens-shaped member) is formed by using a combination of a crystalline fluororesin and a silicone resin and using a crystalline fluororesin resistant to short-wavelength light for a portion mainly irradiated with light, and light extraction efficiency is improved while light distribution is controlled.

CITATION LIST

Patent Document 1: JP-A 2019-220507
Patent Document 2: JP-A 2020-025089

SUMMARY OF THE INVENTION

However, the use of the cylindrical lens described in JP-A 2019-220507 (Patent Document 1) requires advanced optical calculation. If the cylindrical lens is used, the SMD PKG increases in size in a Z direction (height direction). Thus, when considering that an optical element package is provided by using an optical element or an optical device (optical element module) is provided by using the optical element package, the optical element package and the optical device (optical element module) increase in size, which is disadvantageous in their design. Furthermore, examples of the window material capable of stably taking out light having an ultraviolet region for a long time include synthetic quartz glass, but the processing of the synthetic quartz glass into a lens shape increases the cost.

The method of using the crystalline fluororesin for the lens-shaped member described in JP-A 2020-025089 (Patent Document 2) makes it difficult to say that it has high durability with respect to an object used for a long period of time such as an LED from the viewpoint of transmittance of light having an ultraviolet region, deterioration in a resin due to ultraviolet light, and securement of airtightness.

The present invention has been made in view of the above circumstances, and it is an object of the present invention to provide a window material for an optical element that is formed of synthetic quartz glass as a material having high durability against light having an ultraviolet region, is likely to be subjected to shape processing, can be manufactured at low cost, and has a flat plate shape, and a lid for an optical element package including the window material for an optical element, and particularly to provide a window material for an optical element that can efficiently collect light emitted from a light source having a light distribution angle without having a lens shape such as a convex shape, and has a flat plate shape, and a lid for an optical element package including the window material for an optical element. Another object of the present invention is to provide an optical element package in which an optical element is sealed using the lid for an optical element package, and an optical device including the window material for an optical element.

As a result of intensive studies to solve the above problems, the present inventors have found that the micro shape of a main surface through which light is transmitted is formed into a rough surface having a predetermined surface property based on Geometrical Product Specification (GPS), whereby light having a light distribution angle can be efficiently collected by a window material that is likely to be subjected to shape processing and can be manufactured at low cost, has a flat plate shape, and is formed of synthetic quartz glass, and have completed the present invention.

Therefore, the present invention provides the following window material for an optical element, lid for an optical element package, optical element package, and optical device.

1. A window material for an optical element package that houses an optical element emitting or receiving light, or for an optical device including an optical element package that houses an optical element emitting or receiving light,
wherein:
the window material for an optical element is formed of synthetic quartz glass,
has a flat plate shape, and
includes main surfaces through which the light is transmitted, at least one of the main surfaces being a rough surface; and
in the main surface as the rough surface, a total value of a dale void volume (Vvv) of a scale-limited surface having an areal material ratio of 10% and a peak material volume (Vmp) of a scale-limited surface having an areal material ratio of 80% is $1.7 \times 10^4$ $\mu m^3$ or more, the areal material ratio defined according to JIS B 0681-2: 2018.

2. The window material for an optical element according to 1, wherein the window material has a thickness of 0.1 to 3 mm.

3. The window material for an optical element according to 1 or 2, wherein the main surface as the rough surface has a surface roughness (Ra) of 0.1 to 0.5 μm.

4. A lid for an optical element package including: the window material for an optical element according to any one of 1 to 3; and an adhesive agent layer laminated on a part of one of the main surfaces of the window material for an optical element.

5. The lid for an optical element package according to 4, wherein an adhesive agent constituting the adhesive agent layer is at least one selected from a resin-based adhesive agent and a metal-based adhesive agent.

6. The lid for an optical element package according to 4 or 5, wherein the adhesive agent layer is in a semi-cured state (B-stage).

7. An optical element package including:
an optical element; a housing member in which the optical element is installed; the window material for an optical element according to any one of 1 to 3; and an adhesive layer, wherein:
the window material for an optical element is provided at a position through which the light passes; and the optical element is housed in the housing member to join the housing member and the window material for an optical element to each other for sealing with the adhesive layer interposed therebetween.

8. The optical element package according to 7, wherein the optical element is a light emitting element that emits light having a wavelength of 220 to 600 nm or a light receiving element that receives the light.

9. The optical element package according to 7 or 8, wherein the optical element is a light emitting element that emits light having a light distribution angle of 150 degrees or less.

10. The optical element package according to any one of 7 to 9, wherein: the optical element is a light emitting element; and a shortest distance between the light emitting element and the window material for an optical element is 0.5 to 10 mm.

11. An optical device including:
an optical element package in which a light emitting element is installed; and the window material for an optical element according to any one of 1 to 3, wherein
the window material for an optical element is provided at a position through which the light passes.

12. The optical device according to 11, wherein the optical element is an optical element that emits light having a wavelength of 220 to 600 nm or a light receiving element that receives the light.

13. The optical device according to 11 or 12, wherein the optical element is a light emitting element that emits light having a light distribution angle of 150 degrees or less.

14. The optical device according to any one of 11 to 13, wherein: the optical element is a light emitting element; and a shortest distance between the optical element package and the window material for an optical element is 0.5 to 10 mm.

Advantageous Effects of the Invention

The window material for an optical element of the present invention is formed of synthetic quartz glass that is likely to be subjected to shape processing, can be manufactured at low cost, and has a flat plate shape. Even if the window material for an optical element has a flat plate shape, for example, in a window material of a UV-LED such as a UVC-LED sealed on a surface mount package (SMD PKG), light emitted from an optical element, in particular, light having a light distribution angle can be efficiently collected when passing through the window material, and light collection equal to a window material having a lens shape such as a conventional convex shape can be achieved. Furthermore, light distribution without irradiation unevenness such as Lambertian reflection can also be achieved.

In an optical element package or an optical device using the window material for an optical element of the present invention, the volume can be made smaller than that of an optical element package or an optical device using a conventional window material having a lens shape such as a convex shape, and thus the compactness and cost reduction of an optical element package or an optical device (optical element module) using a UV-LED or the like can be expected, and the degree of freedom in designing the optical device (optical element module) is also high.

DESCRIPTION OF THE PREFERRED EMBODIMENT

Hereinafter, the present invention is described in detail.
A window material for an optical element of the present invention is suitably used for an optical element package that houses an optical element emitting or receiving light, and is a window material provided at a portion where light comes in and out between the inside and outside of the optical element package. In the optical element package, the optical element is housed in a housing member and sealed with the window material for an optical element. The window material for an optical element of the present invention is suitably used for an optical device including an optical element package that houses an optical element emitting or receiving light, and is a window material provided at a portion where light comes in and out between the inside and outside of an optical device.

The window material for an optical element of the present invention is formed of synthetic quartz glass. The window material for an optical element of the present invention has a flat plate shape. In the present invention, the flat plate shape is not a shape such as that of a convex lens that causes a convex surface to collect light. For example, both main surfaces of the window material for an optical element through which light is transmitted are preferably substantially flat, and in particular, both the main surfaces of the window material for an optical element through which light is transmitted are preferably substantially parallel. If the window material for an optical element of the present invention has a flat plate shape, the size and thickness of the window material for an optical element can be appropriately selected in consideration of the size of a housing member, the mechanical strength of the window material for an optical element, and the mechanical strength of the window material for an optical element when the window material for an optical element is used as the optical element package or the optical device, and the like. Furthermore, the thickness of the window material for an optical element of the present invention can be appropriately selected in consideration of the attenuation of the wavelength of light with respect to the optical element, and a difference in pressure between the inside and outside of the window material, that is, between the inside and outside of the package for an optical element (for example, a difference in atmospheric pressure between the inside and outside of the package for an optical element). More specifically, the thickness of the window material is preferably 0.1 mm or more, more preferably 0.2 mm or more, and preferably 3 mm or less, more preferably 2 mm or less.

In the present invention, at least one of the main surfaces of the window material for an optical element through which light is transmitted is a rough surface in order to scatter the light on the main surface. This rough surface is a rough surface having a predetermined surface property based on Geometrical Product Specification (GPS). In the present invention, the predetermined surface property is characterized in that a total value of a dale void volume (Vvv) of a scale-limited surface having an areal material ratio of 10% and a peak material volume (Vmp) of a scale-limited surface having an areal material ratio of 80% is $1.7 \times 10^4$ $\mu m^3$ or more, the areal material ratio defined according to JIS B 0681-2: 2018. When the window material for an optical element has such a surface property, light distribution characteristics having high light collecting characteristics are obtained even in the flat surface. When the total value of Vvv and Vmp is less than $1.7 \times 10^4$ $\mu m^3$, irregularities of the main surface of the window material for an optical element through which light is transmitted are large. Therefore, an amount of light scattered on the main surface is small, and an amount of light passing through the window material is large as linear light. Light having a light distribution angle cannot be sufficiently collected, which makes it difficult to obtain a light collecting type radiation flux such as Lambert reflection from light having a light distribution angle. The surface property of the window material for an optical element can be measured by a three-dimensional surface shape measuring machine or the like.

In the present invention, the main surface as a rough surface of the window material for an optical element, preferably has a surface roughness (Ra) of 0.1 µm or more, and preferably 0.5 µm or less, more preferably 0.4 µm or less. If the surface roughness (Ra) of the main surface as a rough surface, is within such a range, it is possible to reduce a defect that light becoming stray light is generated due to an increase in a reflection loss on the main surface of the window material for an optical element, and a possibility that light cannot be sufficiently collected due to a decrease in light reflected on the main surface and an increase in the ratio of parallel light transmitted through the window material as it is.

The window material for an optical element of the present invention is formed of synthetic quartz glass. And the window material for an optical element made of synthetic quartz glass can be manufactured, for example, by the following method. First, a synthetic quartz glass ingot is subjected to machining such as molding, annealing, slicing, chamfering, or lapping to obtain a substrate having a machined surface as a rough surface. In the case of manufacturing a window material for an optical element having both rough surfaces, the process can proceed to a chemical etching (surface processing) step described later through a cleaning step. Meanwhile, in the case of manufacturing a window material having a rough surface on one side, the other surface is further polished to a mirror surface, and the process proceeds to a chemical etching (surface processing) step described later through a cleaning step. The rough surface may be obtained by once mirror-finishing one surface or both surfaces and then re-roughening the one surface or both the surfaces by sandblasting or the like.

Next, the substrate obtained by machining is subjected to chemical etching (surface processing). More specifically, the main surface of the substrate having a rough surface obtained by machining is chemically etched to adjust the surface property of the rough surface. The surface property can be adjusted by appropriately selecting the type of an etching solution and an immersion time in the etching solution. As the etching solution, hydrofluoric acid or buffered hydrofluoric acid is suitably used. As the etching solution, an etching solution having a concentration of preferably 1% by mass or more, more preferably 3% by mass or more, still more preferably 5% by mass or more, and preferably 20% by mass or less, more preferably 15% by mass or less is suitably used. When the concentration is lower than the above range, an etching rate is low, which may require a long time to obtain a predetermined surface property, resulting in lowered productivity. Meanwhile, when the concentration is higher than the above range, the etching rate is high, which may make it difficult to perform precise control for obtaining the predetermined surface property.

The chemical etching may be a method of immersing a substrate to be processed in an etching solution, or a method of pouring an etching solution to a substrate to be processed. The processing may be batch processing of processing a plurality of sheets at a time or single sheet processing of processing the plurality of sheets one by one. A processing time due to the etching solution is appropriately set in a range of preferably 15 minutes or more, preferably 100 minutes or less, and more preferably 80 minutes or less. When the processing time is shorter than the above range, a high-concentration etching solution is used in order to obtain a predetermined surface property, which may make it difficult to perform precise control for obtaining the predetermined surface property. Meanwhile, when the processing time is longer than the above range, dissolved glass components are reattached, which may cause a defect. This defect may be particularly significant in the method of immersing a substrate to be processed in an etching solution. Productivity may also deteriorate. After the chemical etching, the substrate can be rinsed (washed with water), and dried to obtain a window material for an optical element. The light distribution characteristics of the obtained window material for an optical element can be evaluated using, for example, an LED module goniophotometer (LEDGON manufactured by Instrument Systems, Inc.).

A lid for an optical element package of the present invention includes: a window material for an optical element; and an adhesive agent layer laminated on a part of one of main surfaces of the window material for an optical element, for example, an outer peripheral edge part of the main surface of the window material as a portion where the window material is in contact with a housing member. The lid for an optical element package is suitably used for sealing an optical element package that houses an optical element required to have airtightness, such as a UV-LED. If the lid for an optical element package is used, an optical element package including an optical element and a housing member housing the optical element therein can be configured, in which the window material and the housing member are bonded by an adhesive agent of the lid for an optical element package, and the optical element is hermetically sealed inside the housing member.

The adhesive agent layer is not particularly limited, but is preferably formed of at least one adhesive agent selected from a resin-based adhesive agent and a metal-based adhesive agent. The resin-based adhesive agent is composed of a paste containing a resin, and in particular, an adhesive agent containing an epoxy resin or a silicone resin or the like can bond synthetic quartz glass since a network having a three-dimensional structure is formed in the adhesive layer formed after bonding (after curing), and can bond many materials such as ceramics and metal plates. Examples of the resin-based adhesive agent include ultraviolet curing type and silicone type adhesive agents, and examples of these adhesive agents include TB3114 (manufactured by ThreeBond Co., Ltd.) and KER-3000-M2 (manufactured by Shin-Etsu Chemical Co., Ltd.). The resin-based adhesive agent can be applied onto the window material for an optical element by a known method to form the adhesive agent layer.

Meanwhile, examples of the metal-based adhesive agent include low-temperature solder materials such as Au—Sn and Zn—Sn, sintered materials using metal nanoparticles such as nanosilver particles, and fused bodies thereof. As the adhesive agents of the sintered materials using the low-temperature solder materials or the metal nanoparticles, commercially available products can be used. In the case of a fusion body of a low-temperature solder material and metal nanoparticles, examples thereof include an adhesive agent obtained by mixing at least one selected from the group consisting of an Sn—Bi solder, an Sn—Zn—Bi solder, and an Sn—Zn solder known as a low-temperature solder material with nanosilver particles having an average primary particle diameter of 100 nm or less as a principal component, and further adding at least one or more metal elements selected from the group consisting of zinc, zirconium, tellurium, antimony, and indium to the mixture. An adhesive agent layer can be formed by applying a metal-based adhesive agent in a paste state before bonding (before curing) onto a window material for an optical element by a known application method such as a dispenser, screen printing, or inkjet printing. The adhesive agent layer can be preheated to a semi-cured state (B-stage) as necessary.

The optical element package of the present invention includes an optical element as a light emitting element or a light receiving element, a housing member in which the optical element is installed, a window material for an optical element, and an adhesive layer. In the optical element package of the present invention, the window material for an optical element is provided at a position through which light passes. In the optical element package, the optical element is housed in the housing member, and the housing member and the window material for an optical element are joined and sealed with the adhesive layer interposed therebetween. In the optical element package, the window material for an optical element and the adhesive layer may be the window material for an optical element of the lid for an optical element package and an adhesive layer formed by curing the adhesive agent layer of the lid for an optical element package.

Figure 1:
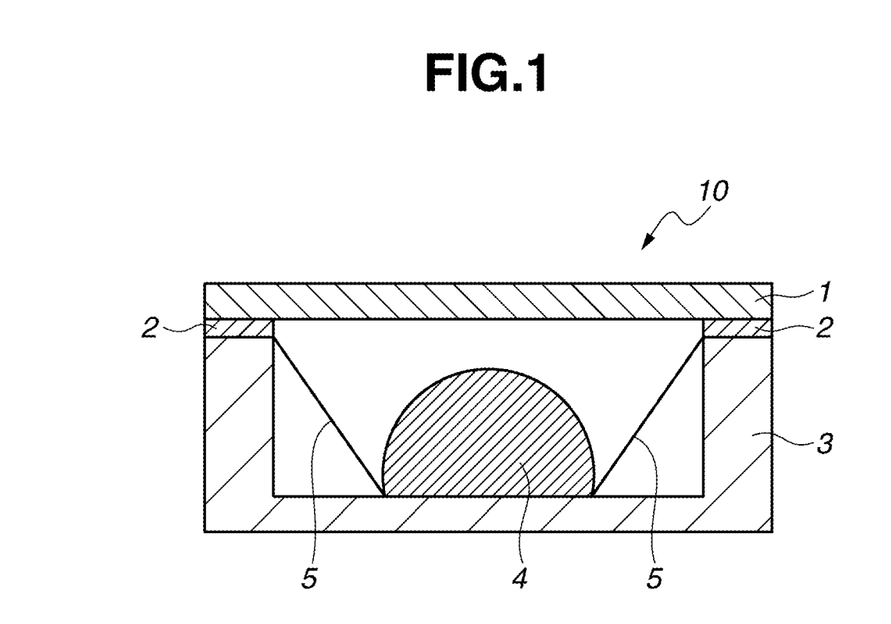
FIG. 1 is a cross-sectional view illustrating an example of an optical element package of the present invention.

In the optical element package of the present invention, the housing member is partially opened. After the optical element is housed, the housing member and the window material for an optical element are joined, and an opening part of the housing member is sealed with the window material for an optical element with the adhesive layer interposed therebetween. Specific examples of the optical element package of the present invention include an optical element package 10 in which a window material 1 for an optical element and a housing member 3 housing an optical element 4 are hermetically sealed with an adhesive layer 2 interposed therebetween, as shown in FIG. 1. In FIG. 1, reference numeral 5 denotes a reflective plate.

The optical element installed inside the housing member may be a light emitting element or a light receiving element. Both the wavelength of light emitted by the light emitting element and the wavelength of light received by the light receiving element are preferably 220 nm or more and preferably 600 nm or less. Examples of the light emitting element include a UV-LED (center wavelength: 260 to 300 nm) using aluminum gallium nitride (AlGaN), a blue light emitting element (wavelength: 440 to 490 nm), a green light emitting element (wavelength: 490 to 580 nm), and a yellow light emitting element (wavelength: 550 to 600 nm), and in particular, a surface-emitting element is suitable.

As the housing member, a known member as a member for housing an optical element in the package for an optical element can be used, and a member having a recessed part as a housing part of an optical element and formed of a metal, an inorganic material such as ceramics, or an organic material such as a rubber, an elastomer, or a resin is suitably used. The size of the housing member is appropriately set according to the use of the optical element, the size of the optical element to be housed, and the size of the window material, and the like. In particular, in an LED, if the optical element is in a high temperature state due to heat generated by the optical element, the light emission efficiency of the optical element is significantly lowered. Therefore, the housing member is suitably formed of alumina ceramic or aluminum nitride ceramic or the like having good heat dissipation, or formed by plating these with metal such as gold or copper as a heat dissipation member.

The illuminance of the light emitted from the light emitting element decreases as an irradiation distance increases. The shortest distance between the optical element, particularly the light emitting element, and the window material for an optical element is preferably 0.5 mm or more, more preferably 1 mm or more, and preferably 10 mm or less, more preferably 8 mm or less because compactness is required in the design of the optical device (optical element module).

In addition to the optical element, other members such as a lead for electrical conduction between the optical element and the outside of the optical element package and a reflector (reflective plate) for improving light extraction efficiency can be provided inside the package for an optical element (a portion surrounded by the housing member and the window material). In the package for the optical element, a portion other than the optical element and other members may be in a vacuum state, a state of being filled with air or a gas such as an inert gas (for example, nitrogen gas), or a state of being filled with a solid such as a transparent rubber, an elastomer, or a resin. However, from the viewpoint of heat dissipation of heat generated by the optical element, the portion is preferably in a vacuum state or a state of being filled with a gas.

The optical device of the present invention includes an optical element package in which an optical element as a light emitting element or a light receiving element is installed, and a window material for an optical element. In the optical device of the present invention, the window material for an optical element is provided at a position through which light passes. Thus, the light distribution of the optical device can be controlled. Examples of the optical device include an optical device including one or more optical element packages such as surface mount packages, and an optical device including two or more arrayed optical element packages (an optical device commonly referred to as an optical element module). The optical device may be a light emitting device or a light receiving device, and a light emitting device such as a light irradiation device is particularly suitable. As the light emitting device, a surface mount package (SMD PKG) of an ultraviolet LED (UV-LED) such as a deep ultraviolet LED is suitable.

Even if one light source of light emission is present in the SMD PKG using a reflector or the like, the emitted light is not point emitted light but pseudo surface emitted light, and is light having a light distribution angle. For example, when a light emitting element commonly used in a UV-LED is die-bonded by a flip-chip method, illuminance unevenness often occurs in addition to the fact that light has a light distribution angle. When uniform irradiation of light is required, such as light resin curing, it is difficult to design an optical device so as to arrange optical element packages having such light distribution characteristics to uniformly irradiate a large area. An optical element package having low output makes it necessary to shorten a distance to an object to be irradiated.

As in the optical device of the present invention, by providing the window material for an optical element of the present invention having main surfaces as rough surfaces having a predetermined surface property at a position through which light passes in the optical element package, illuminance unevenness can be eliminated to efficiently emit light even with small output. In the optical device of the present invention, the window material for an optical element may or may not be bonded. When the window material for an optical element is fixed, the window material for an optical element can also be detachably fixed using a flange or the like. The window material for an optical element used in the optical element package in the optical device of the present invention may be the window material for an optical element of the present invention having main surfaces as rough surfaces having a predetermined surface property, or may be other window materials.

Since compactness in design of an optical device (optical element module) is required, the shortest distance between an optical element package, particularly an optical element package in which an optical element is a light emitting element, and a window material for an optical element is preferably 0.5 mm or more, more preferably 1 mm or more, and preferably 10 mm or less, more preferably 8 mm or less.

The window material for an optical element, the lid for an optical element package, the optical element package, and the optical device of the present invention are all particularly effective for an optical element such as a light emitting element or a light receiving element that emits or receives ultraviolet light having a wavelength of 400 nm or less, particularly deep ultraviolet light having a wavelength of 280 nm or less. The window material for an optical element, the lid for an optical element package, the optical element package, and the optical device of the present invention are all particularly effective for a light emitting element that emits light having a light distribution angle of 150 degrees or less.

EXAMPLES

Hereinafter, the present invention is specifically described below with Examples and Comparative Examples, but the present invention is not limited to the following Examples.

Example 1

A sliced synthetic quartz glass substrate was lapped with a double-sided lapping machine performing planetary motion to obtain a synthetic quartz glass wafer substrate having a thickness of 0.5 mm and including both main surfaces as rough surfaces. Next, the obtained synthetic quartz glass substrate was immersed in 8% by mass buffered to hydrofluoric acid for 60 minutes, washed with water, and dried to obtain a window material for an optical element having a flat plate shape.

The surface quality of the main surface as the rough surface of the obtained window material for an optical element was evaluated. A dale void volume (Vvv) of a scale-limited surface having an areal material ratio of 10% and a peak material volume (Vmp) of a scale-limited surface having an areal material ratio of 80% were measured using a white interferometer (Nexview manufactured by Zygo Corporation). The areal material ratio was defined according to JIS B 0681-2: 2018. As a result, the total value (Vvv+Vmp) of the volumes was $1.91 \times 10^4$ µm³ for both the main surfaces (rough surfaces). The surface roughness (Ra) of the main surface as the rough surface of the obtained window material for an optical element was measured, and 0.41 µm for both the main surfaces.

Next, a metal-based adhesive agent was applied to the outer peripheral edge part of the main surface as a portion to be joined to the housing member of the obtained window material for an optical element by screen printing so that the line width was 0.25 mm, to form an adhesive agent layer, thereby obtaining a lid for an optical element package. As the metal-based adhesive agent, a metal-based adhesive agent containing nano-silver particles having silver cores having an average primary particle size of 50 nm as a principal component, bismuth, tin, and indium was used.

Figure 2:
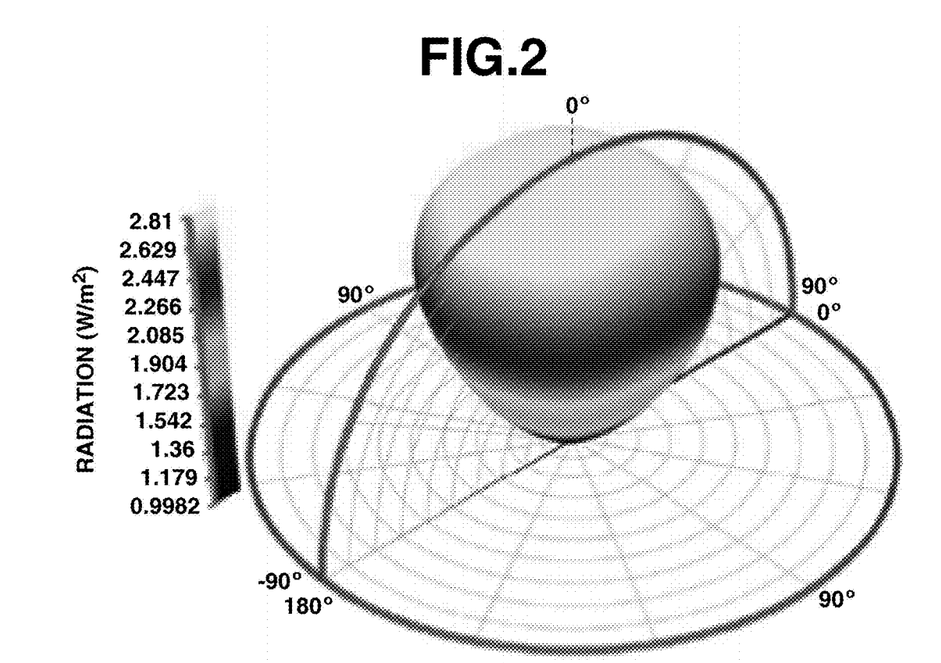
FIG. 2 is a three-dimensional map of light distribution of an optical element package of Example 1.

Next, an upper part of a 3.5 mm square surface mount package (SMD PKG) carrier (housing member) using aluminum nitride as a base material was sealed with the lid for an optical element package obtained above to obtain a surface mount package (SMD PKG). In the surface mount package carrier, a 50 mW class UVC-LED element (optical element) having a wavelength of 265 nm and an initial light distribution angle of 120 degrees was installed. As the SMD PKG carrier, one obtained by gold-plating a portion to be bonded to a synthetic quartz glass lid (a surface in contact with the adhesive agent layer) was used. An LED in the obtained SMD PKG (optical element package) was turned on, and a light distribution angle was measured using an LED module goniophotometer (LEDGON manufactured by Instrument Systems, Inc.). As a result, the light distribution angle was 70 degrees. The light distribution characteristics (three-dimensional map of light distribution) are shown in FIG. 2. In this case, the light distribution was close to Lambertian reflection without irradiation unevenness from batwing light distribution as the original light distribution of the LED, and the light distribution characteristics were changed.

Example 2

A synthetic quartz glass wafer substrate was obtained in the same manner as in Example 1. Next, the obtained synthetic quartz glass substrate was immersed in 10% by mass buffered hydrofluoric acid for 15 minutes, washed with water, and dried to obtain a window material for an optical element having a flat plate shape.

The surface quality of a main surface as a rough surface of the obtained window material for an optical element was evaluated in the same manner as in Example 1. As a result, the total value (Vvv+Vmp) of the volumes was $7.02 \times 10^4$ $\mu m^3$ for both the main surfaces (rough surfaces). The surface roughness (Ra) of the main surface as the rough surface of the obtained window material for an optical element was measured, and 1.02 μm for both the main surfaces.

Figure 3:
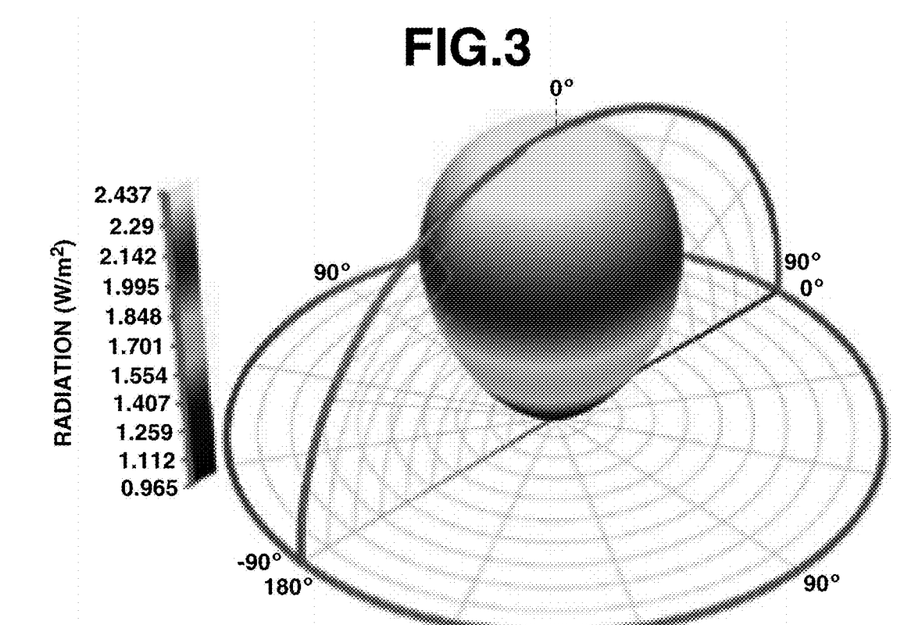
FIG. 3 is a three-dimensional map of light distribution of an optical element package of Example 2.

Next, an upper part of the same surface mount package (SMD PKG) carrier (housing member) as that in Example 1 was sealed with the lid for an optical element package obtained by the same method as that in Example 1 to obtain a surface mount package (SMD PKG). In the surface mount package carrier, a 50 mW class UVC-LED element (optical element) having a wavelength of 280 nm and an initial light distribution angle of 130 degrees was installed. When an LED in the obtained SMD PKG (optical element package) was turned on and a light distribution angle was measured in the same manner as in Example 1, the light distribution angle was 48 degrees. The light distribution characteristics (the three-dimensional map of light distribution) are shown in FIG. 3. In this case, the light distribution was closer to Lambertian reflection without irradiation unevenness from the original batwing light distribution of the LED than in the case of Example 1, and the light distribution characteristics were changed.

Example 3

A sliced synthetic quartz glass substrate was lapped with a double-sided lapping machine performing planetary motion, and further mirror-finished with a single-sided polishing machine performing planetary motion to obtain a synthetic quartz glass wafer substrate having a thickness of 0.8 mm and including one main surface as a rough surface and the other main surface as a mirror surface. Next, the obtained synthetic quartz glass substrate was immersed in 5% by mass buffered hydrofluoric acid for 30 minutes, washed with water, and dried to obtain a window material for an optical element having a flat plate shape.

The surface quality of a main surface as a rough surface of the obtained window material for an optical element was evaluated in the same manner as in Example 1. As a result, the total value (Vvv+Vmp) of the volumes was $2.05 \times 10^4$ $\mu m^3$ for the main surface (rough surface). The surface roughness (Ra) of the main surface as the rough surface of the obtained window material for an optical element was measured, and 0.39 μm for the main surface (rough surface).

Figure 4:
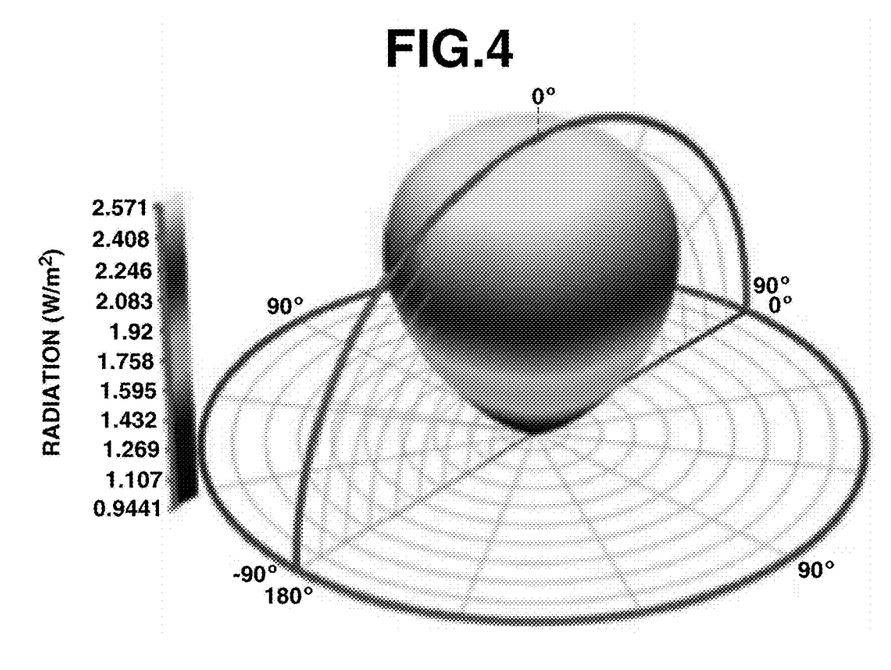
FIG. 4 is a three-dimensional map of light distribution of an optical element package of Example 3.

Next, an upper portion of the same surface mount package (SMD PKG) carrier (housing member) as that of Example 1 was sealed with the lid for an optical element package obtained in the same manner as in Example 1 to obtain a surface mount package (SMD PKG). In the surface mount package carrier, the same UVC-LED element (optical element) as that of Example 1 was installed. When the LED in the obtained SMD PKG (optical element package) was turned on and a light distribution angle was measured in the same manner as in Example 1, the light distribution angle was 60 degrees. The light distribution characteristics (the three-dimensional map of light distribution) are shown in FIG. 4. In this case, the light distribution was close to Lambertian reflection without irradiation unevenness from batwing light distribution as the original light distribution of the LED, and the light distribution characteristics were changed.

Comparative Example 1

A synthetic quartz glass wafer substrate was obtained in the same manner as in Example 1. Next, the obtained synthetic quartz glass substrate was immersed in 10% by mass buffered hydrofluoric acid for 180 minutes, washed with water, and dried to obtain a window material for an optical element having a flat plate shape.

The surface quality of a main surface as a rough surface of the obtained window material for an optical element was evaluated in the same manner as in Example 1. As a result, the total value (Vvv+Vmp) of the volumes was $1.38 \times 10^4$ $\mu m^3$ for both the main surfaces (rough surfaces). The surface roughness (Ra) of the main surface as the rough surface of the obtained window material for an optical element was measured, and 0.36 μm for both the main surfaces.

Figure 5:
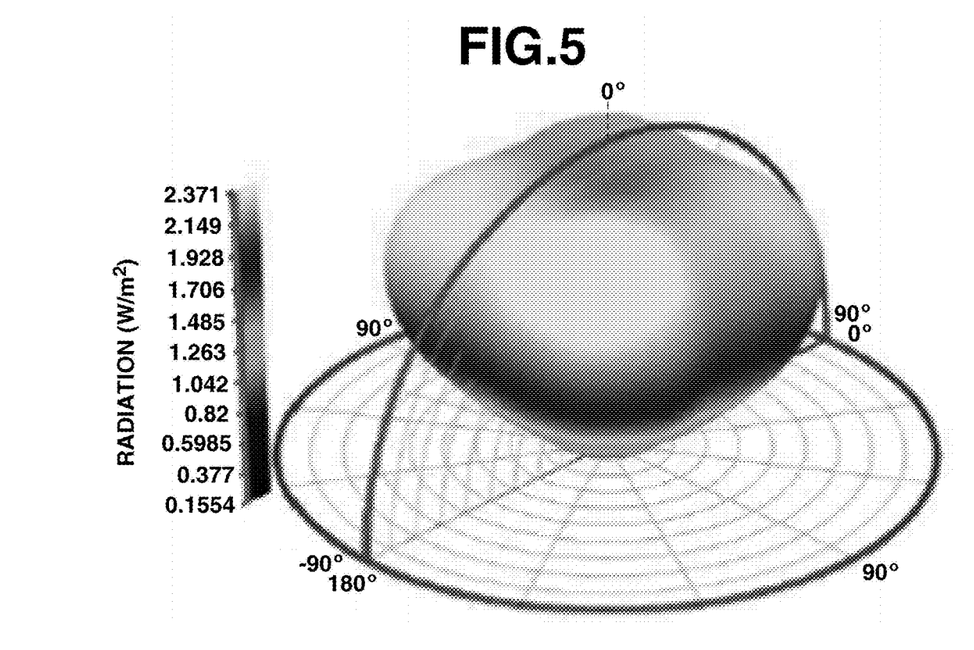
FIG. 5 is a three-dimensional map of light distribution of an optical element package of Comparative Example 1.

Next, an upper portion of the same surface mount package (SMD PKG) carrier (housing member) as that of Example 1 was sealed with the lid for an optical element package obtained in the same manner as in Example 1 to obtain a surface mount package (SMD PKG). In the surface mount package carrier, the same UVC-LED element (optical element) as that of Example 1 was installed. When an LED in the obtained SMD PKG (optical element package) was turned on and a light distribution angle was measured in the same manner as in Example 1, the light distribution angle remained at 120 degrees. The light distribution characteristics (the three-dimensional map of light distribution) are shown in FIG. 5. In this case, the light distribution remained close to batwing light distribution unique to flip-chip type UVC-LED SMD PKG, and no change was observed in the light distribution characteristics.

Example 4

A window material for an optical element obtained in the same manner as in Example 2 was installed at a position of 4 mm from a window material of an SMD PKG on a deep ultraviolet LED module to constitute an optical device (light emitting device). In the deep ultraviolet LED module, 3.5 mm square surface mount packages (SMD PKG) (VPS-171 manufactured by Nikkiso Co., Ltd.) housing a 30 mW class UVC-LED element having a wavelength of 285 nm and an initial light distribution angle of 130 degrees were arranged in 3×3 rows.

When an LED in the obtained optical device was turned on and a light distribution angle was measured in the same manner as in Example 1, the light distribution angle was 48 degrees.

Japanese Patent Application No. 2021-183316 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A window material for an optical element package that houses an optical element emitting or receiving light, or for an optical device including an optical element package that houses an optical element emitting or receiving light,
wherein:
the window material
is formed of synthetic quartz glass,
has a flat plate shape,
collects light having a light distribution angle, and
includes main surfaces through which the light is transmitted, at least one of the main surfaces being roughened; and
in the roughened main surface, a total value of a dale void volume (Vvv) of a scale-limited surface having an areal material ratio Smr(c) of 10% and a peak material volume (Vmp) of a scale-limited surface having an areal material ratio Smr(c) of 80% is $1.7 \times 10^4$ μm³ or more, the areal material ratio defined according to JIS B 0681-2:2018, wherein
the areal material ratio Smr(c) is a ratio (expressed as a percentage) of a cross-section area of the scale-limited surface at a height (c) to an evaluation area of a reference plane.

2. The window material for an optical element according to claim 1, wherein the window material has a thickness of 0.1 to 3 mm.

3. The window material for an optical element according to claim 1, wherein the roughened main surface has a surface roughness (Ra) of 0.1 to 0.5 μm.

4. A lid for an optical element package comprising:
the window material for an optical element according to claim 1; and
an adhesive agent layer laminated on a part of one of the main surfaces of the window material for an optical element.

5. The lid for an optical element package according to claim 4,
wherein an adhesive agent constituting the adhesive agent layer is at least one selected from a resin-based adhesive agent and a metal-based adhesive agent.

6. The lid for an optical element package according to claim 4, wherein the adhesive agent layer is in a semi-cured state (B-stage).

7. An optical element package comprising:
an optical element;
a housing member in which the optical element is installed;
the window material for an optical element according to claim 1; and
an adhesive layer,
wherein:
the window material for an optical element is provided at a position through which the light passes; and
the optical element is housed in the housing member to join the housing member and the window material for an optical element to each other for sealing with the adhesive layer interposed therebetween.

8. The optical element package according to claim 7, wherein the optical element is a light emitting element that emits light having a wavelength of 220 to 600 nm or a light receiving element that receives the light.

9. The optical element package according to claim 7, wherein the optical element is a light emitting element that emits light having a light distribution angle of 150 degrees or less.

10. The optical element package according to claim 7, wherein:
the optical element is a light emitting element; and
a shortest distance between the light emitting element and the window material for an optical element is 0.5 to 10 mm.

11. An optical device comprising: an optical element package in which a light emitting element is installed; and
the window material for an optical element according to claim 1,
wherein the window material for an optical element is provided at a position through which the light passes.

12. The optical device according to claim 11, wherein the optical element is an optical element that emits light having a wavelength of 220 to 600 nm or a light receiving element that receives the light.

13. The optical device according to claim 11,
wherein the optical element is a light emitting element that emits light having a light distribution angle of 150 degrees or less.

14. The optical device according to claim 11,
wherein:
the optical element is a light emitting element; and
a shortest distance between the optical element package and the window material for an optical element is 0.5 to 10 mm.

15. The window material for an optical element according to claim 1, wherein the window material collects the light having the light distribution angle that is emitted from a light source.

16. The window material for an optical element according to claim 1, wherein the window material collects the light distribution angle of 150 degrees or less.

* * * * *